June 23, 1953  J. BERNIER  2,643,280
METHOD AND APPARATUS FOR POWER MEASUREMENT
AND DETECTION AT ULTRAHIGH FREQUENCIES
Filed Sept. 4, 1946  2 Sheets-Sheet 1
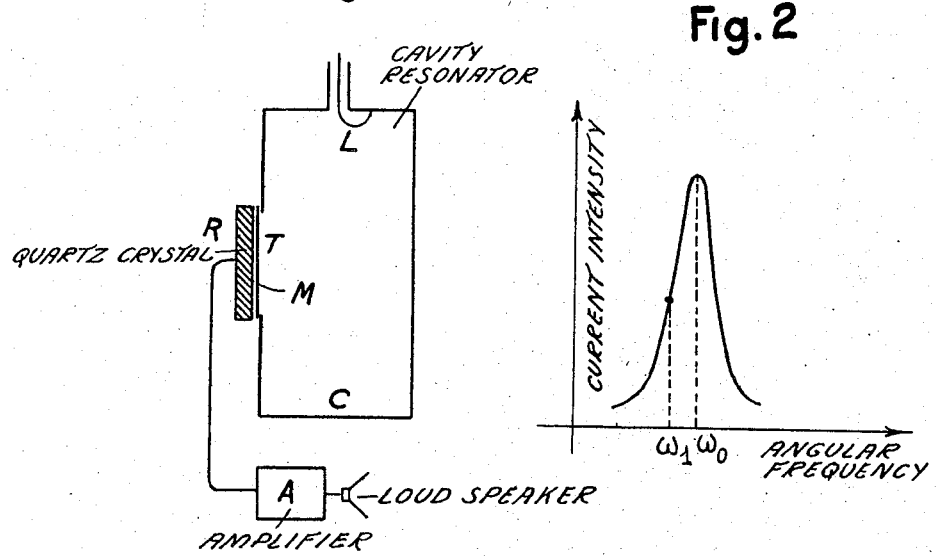
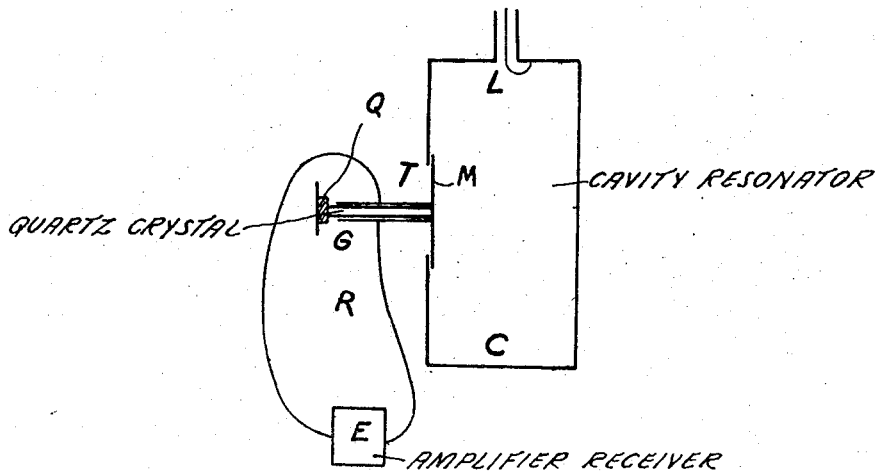
INVENTOR
JEAN BERNIER,

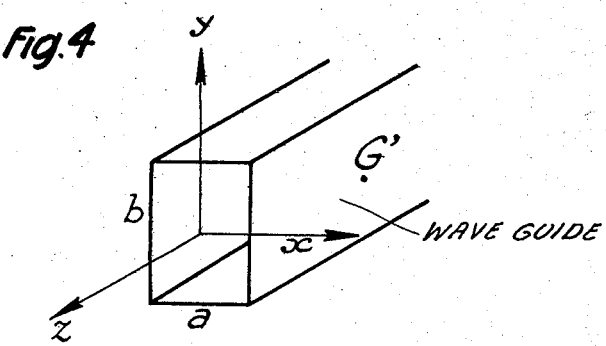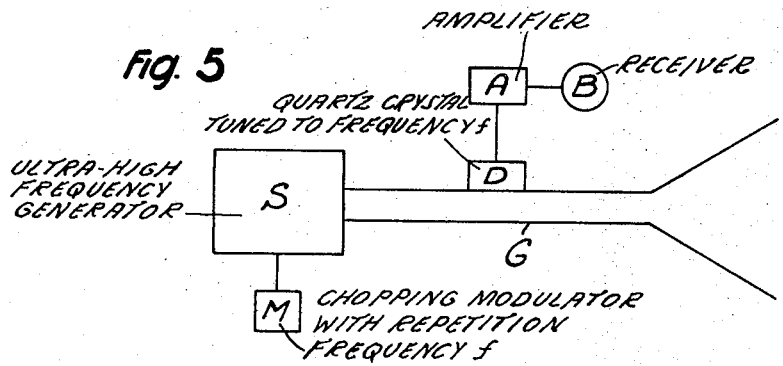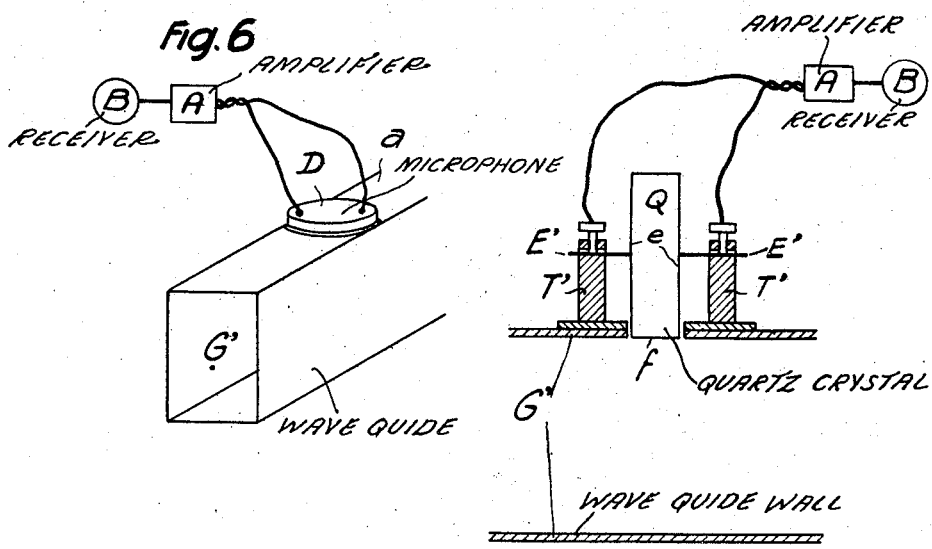

Patented June 23, 1953

2,643,280

UNITED STATES PATENT OFFICE 2,643,280

METHOD AND APPARATUS FOR POWER MEASUREMENT AND DETECTION AT ULTRAHIGH FREQUENCIES

Jean Bernier, Paris, France, assignor to Compagnie Generale de Telegraphie Sans Fil, a corporation of France Application September 4, 1946, Serial No. 694,777
In France October 26, 1942

Section 1, Public Law 690, August 8, 1946
Patent expires October 26, 1962

17 Claims. (Cl. 171—95)

This invention relates to a new method and apparatus for power measurements and detection at ultra-high frequencies.

One of the objects of the present invention is to provide a method of detecting ultra-short electromagnetic waves limited by a metallic surface such as the inside surface of a cavity or of a dielectric guide.

The principle of this method consists in providing the metallic surface limiting the waves to be detected with at least one element of a displaceable surface and detecting the pressure of radiation, applied upon the said element of surface by the waves to be detected.

Another object of the invention also concerns devices utilizing the said method, these devices, as wattmeters and detectors of modulation, demonstrating a great sensitiveness and having no reaction upon the load or tuning of the generator producing the waves to be detected. The application of the method of detection, according to the invention, to measurements in a cavity and in a dielectric guide, respectively, will be understood from the following specification, in which:

Figure 1 diagrammatically illustrates a detector embodying the principles of my invention;

Fig. 2 is a characteristic curve showing the resonance characteristics of the cavity in the detector illustrated in Fig. 1;

Fig. 3 diagrammatically illustrates my invention as applied to a wattmeter;

Fig. 4 is a vector diagram describing the principles of my invention;

Fig. 5 is a block diagram showing one manner of impressing high frequency waves upon a detector system operating in accordance with my invention;

Fig. 6 is a schematic view of a pressure detector constructed in accordance with my invention; and Fig. 7 is a cross sectional view of an apparatus carrying out the principles of my invention.

It is known that electromagnetic waves exert on a metallic surface limiting them, a pressure of radiation which is normal to the surface and which has at any time, by unity of surface, $p$ for value, taken in a positive direction to the normal, that is, coming from the interior towards the exterior, given by the equation:

$$p = \frac{1}{8\pi}(H^2 - E^2) \text{ baryes} \qquad (1)$$

In this equation, holding good in the case of the surface perfectly conductive, E and H are quantities represented at the considered point of the surface of the electric and magnetic fields measured in mixed Gauss C. G. S. units. A real pressure takes place, or a suction, according to the relative magnitudes of E and H.

In the case of a metallic surface enveloping the said waves, it is generally possible to determine the distribution of the electromagnetic field at the interior of the said surface and it results that from the measure of the pressure of radiation on an elastic element there can be inferred the strength of the high-frequency wave which reflects thereon. The measuring process according to the invention, applied to electromagnetic waves of ultra-high frequency, is characterized by the fact that there is measured, by means known in themselves, the pressure which they exert on at least one elastic element of high surface conductivity which, inserted in one of the metal walls on which they reflect, does not form any projection on this wall.

First of all there will be considered the application of the invention, when utilizing a resonant cavity. It is known that cavities are hollow, metallic chambers, completely closed and with walls of a high conductivity. They have different methods of vibration, and, consequently, several natural wave lengths: these natural wave lengths are of the same order of magnitude as their linear dimensions. Thus, a prismatic cavity with a square base has a method of vibration (fundamental method) such that the natural wave length is equal to the length of the diagonal line of the base and is independent from the height of the prism.

These cavities have also a very high quality factor: for a cube having a wall of copper, of 20 cm. each side (natural wave length: 28.3 cm.), the quality factor is $Q = 33,000$—in consequence it is possible to sustain a considerable electromagnetic energy in a cavity by means of a very small exterior contribution.

By applying the equation (1) mentioned above, to the case of a parallelepipedic case excited according to its fundamental method of vibration, it is found that a pressure is exerted on the lateral walls, viz., according to the place considered, a pressure or a suction on the bases. At the center of the bases the effect is at its utmost and its means value in the course of time is $$p_{max} = \frac{3.37}{a^{3/2}} \frac{1}{1 + \frac{2l}{a}} p \text{ baryes}$$

where
$a$ (cms.) is the side of the square base
$l$ (cms.) is the height of the parallelepiped
$p$ (watts) is the ultra high frequency power of excitation.

For such a cavity, the natural wave length is: $\lambda = a\sqrt{2}$ cm. (independent of the height $l$) this pressure is also expressed by:

$$p_{max} = \frac{5.66}{\lambda \text{ cm.}^{3/2}} \frac{1}{1 - 2.83\frac{1}{\lambda}} p_w \text{ baryes}$$

On the bases of the parallelepiped, the zone of suction is centrally positioned; it is approximately circular and of radius $a\sqrt{2}/4$ or $\lambda/4$.

These results may be qualitatively applied to all forms of cavity; they show, in particular:

(1) That the pressure is rigorously proportional to the high frequency power of excitation $p$;

(2) That the same is proportional the 3/2 power of the natural frequency of the cavity.

(3) That, if the cavity is prismatic (or cylindrical) and excited according to its fundamental method of vibration (natural frequency independent of height $l$), the less high the cavity, the greater is the pressure.

I have set forth hereinafter a few numerical results which serve as a vindication of the method of my invention.

There will be considered at first a cavity having a square base and walls of copper, resonating on a wave length of 10 cm., with a side $a=7.07$ cm. and a height $l:a/2=3.5$ cm. The pressure of radiation is at its maximum in the centre of the base and has for value (suction): $p_{max}=0.09$ barye per watt of excitation.

This pressure can be detected through means known at the present time, such as microphones, piezoelectric quartz crystals, etc.

The apparatus according to the invention is characterized by the fact that the elastic element of high surface conductivity on which it exerts the pressure of radiation closely fits the form of the wall where it is inserted and connects with it by a joint of such dimensions that it short-circuits for ultra-high frequency waves. I shall describe hereinafter, by way of example, a form of the apparatus which enables the control of the quality of the modulation of the carrier wave in a radioelectric station.

The detector is diagrammatically respresented in Fig. 1. It is essentially composed of a cavity C, the wall of which is pierced with a hole T. Close against this hole, at a very little distance of the wall, or else fixed at the wall, there is applied a disc or a metallic membrane M (or simply, a metallized one) the role of which is only to transmit the pressure of radiation to a microphonic relay R. This relay R (of a piezoelectric, electromagnetic or any other nature) is connected to an ordinary telephone amplifier A, but having a first stage especially well designed.

Furthermore, in Fig. 1 there is represented a loop and a portion of line L which permits of introducting into the cavity the ultra high frequency modulated power P. A means for adjusting the natural wave length of the cavity (not shown in Fig. 1) must also be provided for. The usual means of tuning are the deformation of the wall of the cavity or the deformation of the field within the cavity. The latter deformation may, for example, be obtained with plunging rods. In the case of a prismatic cavity, it is possible to render movable one of the lateral walls of the cavity.

In the above description, it was supposed that the pressure of radiation was detected by a microphonic relay, but it is well understood that any other means of detection can be used, and as such, optical means, or piezo-electric means based on the effort exerted by the field of the cavity on a plate of quartz (or any other crystal) which is metallized and inserted in the wall of the cavity. The essential condition is that the part of the relay in contact with the field of the cavity should be metallic (or metallized) and of high superficial electric conductivity.

The device thus designed can be used for the detection of amplitude modulation or for the frequency modulation of carrier waves of an ultra high frequency.

Actually, in the case of a carrier which is amplitude modulated, one shall begin by so adjusting the cavity, that its natural frequency is exactly equal to the frequency of the carrier. The mechanical force acting upon relay R being rigorously proportional to the high frequency power $p$ brought into the device, the low frequency modulation of $p$ will induce at the output of R a low frequency current, the magnitude of which will be rigorously proportional to variable amplitude of $p$.

I provide another form of the apparatus as an embodiment of my invention which permits the measuring directly of the power of one wave of ultra high frequency pure or modified.

The resonance curve of a cavity being very acute, one may be lead for the adjustment, to couple to the cavity of the detector an adequate load, so as to flatten the resonance and thus increase the width of the frequency band that it is possible to detect without abnormal distortion.

I shall now describe, my way of example, another embodiment of the apparatus of my invention which enables the direct measurement of the strength of a pure or modulated ultra-high frequency wave.

This instrument is diagrammatically represented in Figure 3. It essentially comprises:

(1) A cavity C with highly conductive walls, into which there is introduced the power $p$ to be measured through a coupling system L (preferably adjustable). This cavity is pierced with a hole T;

(2) A disc or membrane M applied against the hole and designed for transmitting the efforts due to the electromagnetic field to a meter R. This disc may be either fixed by the brims thereof to the wall of the cavity, or (as it is shown in Fig. 3) located at a very little distance from the wall (a few $1/100$ of a mm.). The part of disc M which is in contact with the electromagnetic field must be of a high superficial electric conductivity;

(3) A dynamometer R permitting of measuring the effect transmitted by M. This dynamometer may be a micro-balance or any optical, electrical, magnetical, piezoelectrical, etc. system, permitting of measuring forces of the order of magnitude of the dyne.

In Fig. 3, and by way of example, the dynamometer R is constituted by a plate of quartz of Curie cut, the extremities of which are one fixed at the center of disc M and the other to a socket. The lateral faces of the plate are metallized, which permits of collecting the electric charges appearing as a consequence of the effort transmitted by M. These charges are measured by means of an electrometer (e. g., a wire one) or an electrometer valve E. It is known that the charges appearing on the quartz owing to a piezoelectric effect are rigorously proportional to the stress, therefore these charges are rigorously propotional to the power $p$ of excitation measured.

To make a measurement of strength with the apparatus represented by Fig. 3, the following operations are carried out:

(1) Rigorous tuning of the natural frequency of the cavity in agreement with the frequency of the power to be measured by means of an appropriate system (not represented in Fig. 3). This tuning is shown, when reading the electrometer by a displacement maximum.

(2) Adjustment of the coupling system L not to have a stationary wave in the inlet feeder, which would cause the power introduced in the cavity to be inferior to the power to be measured. The exactitude of this adjustment is shown by a new maximum in the reading of the electrometer.

Then the difference in the readings of the electrometer with and without ultra high frequency excitation of the wattmeter, multiplied by the constant of the instrument, gives the value of the power of excitation (a previous calibration of the system of deformation of the cavity also gives the wave length).

The constant of the instrument depends on the constant of the electrometer, of that of the quartz (all constants supposedly known) and also of a constant related to the cavity. This latter, as the calculations succintly developed at the outset have shown, is connected with the quality factor of the cavity.

This coefficient is determined either by calculation, or experimentally by plotting down, through the intermediary of the wattmeter, the resonance curve of the cavity.

This wattmeter, which permits of measuring the power $p$ introduced into the cavity, may also obviously operate as a detector when this power is low frequency modulated; the current circulating in the circuit of the quartz is exactly proportional to the low frequency variations of $p$.

The following numerical example will show the sensitiveness of this wattmeter.

Let us consider a parallelepipedic cavity having a square base, of a natural length of 10 cm., already mentioned as an example. The membrane M is supposed to be square and of side $a/2$; a force of 0.58 dyne per watt of excitation is applied upon this membrane. It is supposed, also, that the plate of quartz used is 2 cm. long and $\tfrac{2}{10}$ mm. thick; the constant of the quartz will be:

$$6.45 \times 10^{-8} \times \frac{2}{0.02} \text{ e. s. U per dyne}$$

and it will appear on the armatures of the quartz a charge of $1.25 \cdot 10^{-15}$ coulomb per watt of excitation. And the electrometer valves are sensitive to charges 10 times smaller.

It is well understood that in the foregoing examples of detector or wattmeter, the choice of a prismatic cavity and the choice of the position of the membrane or disc transmitting the pressure of radiation only aim at simplifying the exposition and the calculations; this choice is in no way restrictive as regards the scope of the invention.

If necessary, two or more elastic elements will be located at suitably chosen points of the cavity and the pressures of radiation at these points will be transmitted to a single amplifying and registering apparatus. The form of the cavity will be chosen so as to increase the pressure of radiation on the elastic elements inserted in the wall. Calculations which could not be reproduced herein, show actually that this sensitiveness can be easily increased for one same wave length, at least in the ratio 1 to 50.

In case the waves to be measured circulate in a wave guide, the Equation 1 is yet applicable and, from the general relations between E and H in a guide for a determined type of wave, it is deduced that the mean value of the pressure of radiation is rigorously proportional to the mean value of the flux of energy through a cross section of the guide; hence:

$$P_\text{baryes} = KW_\text{watts}$$

This pressure will be directly measured, or the variations of the pressure (caused by the variation of power circulating in the guide) will be detected through any device sensitive to low pressures but characterized by the fact that the elastic element of high surface conductivity on which the pressure of radiation exerts itself closely fits the form of this wall and connects with it by a joint of such dimensions that it forms a short-circuit for ultra-high frequency waves. The numerical results given below will constitute an application of the above formula, $$P_\text{baryes} = KW_\text{watts}$$

If a guide G' of a rectangular section (Fig. 4), of sides $a$ and $b$ is traversed by a $H_{01}$ wave, the electric vector of which is parallel to the side $a$, the value of K is:

$$K = -\frac{1}{300}\frac{2}{a\lambda}\frac{1}{u^2\sqrt{u^2-1}}\cos\frac{2\pi y}{b}$$

where $$u = \frac{2b}{\lambda} > 1$$

and $\lambda$ is the wave length in vacuo. It appears that for a same value of $u$, K is greater when $\lambda$ is smaller, that is to say that the pressure of radiation on the walls is increasingly greater when the wave length becomes smaller and smaller.

For $\lambda = 20$ cm. and a guide of $5 \times 15$ cm., $$K = -2.64 \times 10^{-5} \cos 2\pi y/b$$

and, following, the maximum of the absolute value of the mean pressure (obtained either at the middle of side $b$, or at any point of side $a$) is:

$$P_\text{baryes} = 2.64 \times 10^{-5} W_\text{watts}$$

This pressure, when transmitted for instance to the membrane of a microphone, can be easily detected, the sensitiveness of the apparatus being practically limited only by the background noise of the amplifier.

The devices will be described now with more particulars.

Fig. 5 represents the diagram of the principle of the arrangement: S is a high frequency source (klystron, magnetron) feeding to a guide of rectangular waves G'; M is the modulator used for modulating the ultra high frequency of the generator; D is the detector of pressure (microphone element, piezoelectric quartz etc.) where the metallic or metallized element submitted to pressure is present in the center of the wall of the guide; A is an amplifier and B a meter or a loudspeaker.

In the absence of low frequency modulation, the indication of meter B gives the value of the pressure exerted on D, and consequently the value of the field at the wall of the guide; following, there is obtained the ultra high frequency power circulating in the guide if this one is traversed by progressive waves. By displacing D along a longitudinal slot provided in the axis itself of the wall (which will be slotted for that purpose), the indication of B remains unchanged if, in guide G, only progressive waves are circulating; whereupon, eventual variations of B will give, as it is well known, the proportion of stationary waves in the guide, whence one will deduce the effective value of the power transmitted by generator S.

If the ultra high frequency power is modulated, the variations of indicator B will be proportional to the variations of power and the device will be used, together with the known means, as a modulation controller.

Fig. 6 shows an example of embodiment of the detector of pressure D; it is constituted by a microphonic capsule with a metallized membrane, which is locally substituted to the wall $a$ (perforated for that purpose) of a guide G' of a rectangular section.

There will be now described, by way of non-limitative example, a mode of embodiment which is especially well adapted to such systems of modulation as utilize chopping, which systems are encountered in generators of non-linear characteristics, such as the auto-oscillating kylstrons, or again for multiplex connections. This process is described in Philips Technical Review, issue of October 1937, page 301.

The modulator M Fig. 5 is quartz controlled and chops the power transmitted by S into rectangular signals at a frequency of 80 kc. for instance, the low frequency modulation being obtained by varying the width of the signals. The detector D is constituted by a prismatic quartz of Curie cut, resonating on the frequency of the control, that is 80 kc., and the base of which, whereon the pressure of radiation is exerted, is platinized, the dimensions of this base being for instance 1 x 1 cm.$^2$. The piezoelectric response of the quartz to pressure is thus multiplied by the quality factor of the quartz, for instance $10^4$. The voltage which appears at the terminals of the quartz has a magnitude rigorously proportional to pressure and consequently to the power circulating in the guide. If this quartz is located in the center of the face $b$ of a guide of a rectangular section (5 x 15 cm.) traversed by a progressive wave $H_{01}$ of a wave length of 20 cm., it is found that the voltage is 14 $\mu$ v. per watt circulating in the guide, a value quite sufficient for application to an ordinary amplifier.

Fig. 7 shows the section of such a detector: G' is the wall of the guide, it is pierced with a square hole through which there is introduced the platinized base $f$ of quartz Q in such a way that the same is coplanar with wall G' without the quartz coming laterally in contact with the rims of the hole. The metallic coating of $f$ extends by 2 mm. on the longitudinal faces of the quartz so as to form a short circuit for the ultra high frequency. The quartz is held by two electrodes, E, applied respectively to the center of two opposite faces of this quartz and fastened by pressure screws to two feet T of insulating material, integral with the wall of the guide. The voltage appearing at the terminals E' feeds to amplifier A. A sliding system, which is not shown, permits the detector to be displaced longitudinally along the guide, so as to measure the proportion of stationary waves.

It is obvious that, to use the system of Fig. 7 as a modulation controller, it will be necessary to choose the frequency and the quality factor of the piezoelectric crystal in such manner that the low frequency modulation band may pass through sufficiently well. To this end, it will be of advantage to associate several detecting quartz crystals in a known manner, to form a band pass filter.

In the theory developed by Maxwell it is established that the irradiation pressure of electromagnetic radiation is proportional to the energy expressed by the Poynting vector, that is to say, to the square of the electromagnetic field intensity. This is recognized in the physics text book by Prof. Dr. R. Tomaschek, entitled "Grimsehls Lehrbuch der Physik," Zweiter Band, 1936, at pages 584–590. To measure the irradiation pressure is thus the same thing as measuring the square of the electromagnetic field of radiation.

While I have described my invention in certain preferred embodiments I realize that various modifications in construction, form, dimensions and constructive peculiarities may be made and I intend no limitations upon my invention other than may be imposed by the scope of the appended claims.

What I claim is:

1. In an ultra high frequency measuring system in combination with a coaxial cable, an ultra high frequency wave guide connected with the terminus of said cable and having an enclosing wall portion for reflecting ultra high frequency waves interiorly of said wave guide and a mechanical pressure operated detector located within said guide and responsive to mechanical pressures developed by ultra high frequency waves incident upon said wave guide.

2. In an ultra high frequency measuring system in combination with a coaxial cable, an ultra high frequency wave guide connected with the terminus of said cable and having an enclosing wall portion for reflecting ultra high frequency waves interiorly of said wave guide, a piezoelectric crystal mounted in said wave guide, and an indicating circuit connected with said piezoelectric crystal and responsive to currents generated by said piezoelectric crystal under conditions of pressure effects developed by ultra high frequency waves within said wave guide.

3. In an apparatus for measuring irradiation pressure of ultra-short waves on the inside of a duct with a conductive envelope; in combination, a conductive envelope having an opening therein, an elastic element of high surface conductivity inserted with a loose fit in said opening, means for exciting an ultra-high frequency electromagnetic field within said duct, and means associated with the said elastic element which transforms the forces due to said field and acts on said element to a measurable electric magnitude.

4. In a device for propagating ultra-short waves through its interior and which is provided with a highly conductive metal wall enclosing a resonant cavity, a coaxial conductor connected with said cavity for introducing therein waves of ultra-high frequency modulated in amplitude, an elastic element of high surface conductivity which is inserted with a loose fit in a hole of corresponding contour in said wall, means for equalizing the actual fundamental frequency of the cavity to the frequency of the ultra-short wave, a relay connected with said elastic element, means for transforming the forces exerted by these waves on the element into a measurable electric wave for determining the amplitude of the periodic variation of the strength of the wave through the measurement of the amplitude of this current.

5. In a detector system as set forth in claim 4 in which the hole is cut out in the center of the base of a resonant parallelepipedal cavity and in which said ultra-short wave is modulated, a piezoelectric crystal having a metallized face is inserted in this hole with a loose fit so as to be substantially coplanar with the wall, the inherent frequency of vibration of the said crystal being as close as possible to the frequency of modulation of the wave, means for collecting between two electrodes applied on two other parallel faces of said crystal, a current whose amplitude is at any time proportional to the amplitude of the modulation of the wave, and means for amplifying said current and for measuring its amplitude.

6. In a device for propagating ultra-short waves through its interior and which is provided with a highly conductive metal wall enclosing a resonant cavity, a coaxial feed conductor connected with said cavity for introducing therein non-modulated waves of ultra-high frequency, an elastic element of high surface conductivity inserted with small play in a hole of corresponding form cut out in a flat part of said wall and substantially coplanar with said wall, means for equalizing the inherent fundamental frequency of the cavity to the frequency of the carrier wave and for suppressing any reflection of waves in the coaxial feed conductor, a piezoelectric crystal connected with said elastic element, and means for collecting electric charges on two parallel faces of said crystal and for transmitting them to an electrometer having calibrations enabling the direct reading thereon of the constant strength of the wave.

7. In combination, a generator of non-modulated ultra-high frequency waves, an emitter of impulse of periodically variable durations and of a predetermined recurrence frequency for controlling the emission of the generator whereby the emission of said generator is modulated in accordance with said variable impulse durations, a wave guide of straight rectangular section in one of whose walls there is cut out a hole of symmetrical form whose axis is parallel to the longitudinal axis of this wall, a piezoelectric crystal of the same inherent frequency as the said recurrence frequency and one face of which of high surface conductivity is inserted in this hole with small play and being coplanar with the said wall, means for collecting between two parallel faces of the last mentioned piezoelectric quartz crystal a current whose amplitude is at all times proportional to the modulated strength of the wave which circulates in the wave guide, an amplifier, and a measuring apparatus, both connected in series with said last mentioned piezoelectric quartz crystal.

8. In combination in a measuring apparatus as set forth in claim 7, a generator furnishing a low frequency modulated wave, a multiplicity of piezoelectric crystals inserted in the wall of the wave guide whose respective bands of passing frequencies associate so as to coincide with the modulation band of the wave, an amplifier suitably connected with the said piezoelectric crystals, and a measuring apparatus constituting a modulation controller connected with said amplifier.

9. The method of utilizing a movable element for measuring microwave energy comprising the steps of subjecting said element to the field of said microwave energy to provide mechanical displacement thereof substantially only in response to electrostatic field stresses induced in said element by said field, employing said mechanical displacement of said element to control electrical energy, and measuring said controlled electrical energy.

10. The method of utilizing a movable element for measuring microwave energy comprising the steps of subjecting said element to the field of said microwave energy to provide mechanical displacement thereof substantially only in response to electrostatic field stresses induced in said element by said field, employing said mechanical displacement of said element to generate electrical energy, and measuring said generated electrical energy.

11. The method of utilizing a movable element for detecting a microwave field comprising the steps of subjecting said element to said field to provide mechanical displacement thereof substantially only in response to electrostatic field stresses induced in said element by said field, controlling electrical energy in response to said displacement of said element, and detecting said controlled electrical energy.

12. The method of employing a movable element for detecting microwave transmission through a waveguide transmission system comprising the steps of subjecting said element substantially only to the microwave electrostatic field within said waveguide to displace said element as a function of the strength of said electrostatic field, employing said mechanical displacement of said element to control electrical energy, and utilizing said controlled electrical energy.

13. Apparatus for measuring microwave energy comprising a conductor, a source of electrical energy, means for subjecting said conductor substantially only to the electrostatic field of said microwave energy to displace said conductor as a function of the strength of said electrostatic field, means for employing said mechanical displacement of said conductor to control said electrical energy, and means for measuring said controlled electrical energy.

14. Apparatus for measuring microwave energy in a transmission system comprising a conductive element subjected substantially only to the electrostatic field of said microwave energy whereby said element is mechanically displaced as a function of the strength of said electrostatic field, a source of electrical energy, means for controlling said electrical energy source in response to said displacement of said element, and means for measuring said controlled electrical energy.

15. Apparatus for detecting a microwave electrostatic field comprising a mechanical coupling, means for subjecting said coupling substantially only to the electrostatic field component of said microwave field to provide displacement of said coupling in response to electrostatic field stresses induced therein by said field, a source of electrical energy, means for controlling said electrical energy in response to said displacement of said coupling, and means for utilizing said controlled electrical energy.

16. Apparatus for detecting microwave transmission through a waveguide transmission system including a mechanical element subjected to said microwaves in a manner whereby said element is mechanically displaced substantially only as a function of the magnitude of the electrostatic field of said microwaves, a source of electrical energy, means responsive to said mechanical displacement of said element for controlling said electrical energy, and means for detecting said controlled electrical energy.

17. Apparatus for detecting microwave transmission through a waveguide transmission system including a yieldable conductive element forming a portion of said waveguide and subjected substantially only to the electrostatic field of said microwaves in a manner whereby said element is mechanically displaced as a function of the magnitude of said microwave electrostatic field, a source of electrical energy, means coupled to said element and responsive to said displacement thereof for controlling said electrical energy, and means for utilizing said controlled electrical energy.

JEAN BERNIER.

References Cited in the file of this patent

UNITED STATES PATENTS

| Number | Name | Date |
| --- | --- | --- |
| 2,299,260 | Sivian | Oct. 20, 1942 |
| 2,402,544 | Foulds | June 25, 1946 |
| 2,402,663 | Ohl | June 25, 1946 |
| 2,442,614 | Norton | June 1, 1948 |
| 2,453,532 | Norton | Nov. 9, 1948 |

FOREIGN PATENTS

| Number | Country | Date |
| --- | --- | --- |
| 548,681 | Great Britain | Oct. 20, 1942 |